US006781959B1

United States Patent
Garakani et al.

(10) Patent No.: US 6,781,959 B1
(45) Date of Patent: Aug. 24, 2004

(54) METHOD AND APPARATUS FOR DETERMINING TROUBLESHOOTING INFORMATION FOR COMPLETED CALLS IN A TELECOMMUNICATIONS NETWORK

(75) Inventors: Mehryar Garakani, Los Angeles, CA (US); Jochen Weppner, Belmont, CA (US); John Ahlstrom, Cupertino, CA (US); Stephen Schleimer, San Jose, CA (US); Gerard Berthet, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 792 days.

(21) Appl. No.: 09/629,540

(22) Filed: Jul. 31, 2000

(51) Int. Cl.[7] .......................... H04L 1/00; H04L 12/26
(52) U.S. Cl. ...................... 370/242; 370/217; 370/218; 709/203; 709/224
(58) Field of Search ............................... 370/242, 249, 370/243, 244, 252, 260, 261, 257, 352, 353, 401, 402, 442, 458, 466, 490, 217, 218; 455/423, 427, 428; 709/224, 223, 201–220

(56) References Cited

U.S. PATENT DOCUMENTS 6,445,682 B1 * 9/2002 Weitz ........................ 370/257
6,466,548 B1 * 10/2002 Fitzgerald .................. 370/249
6,556,659 B1 * 4/2003 Bowman-Amuah ........ 379/9.04
6,560,222 B1 * 5/2003 Pounds et al. .............. 370/353

* cited by examiner

Primary Examiner—Kenneth Vanderpuye
Assistant Examiner—Anthony Ton
(74) Attorney, Agent, or Firm—Hickman Palermo Truong & Becker LLP

(57) ABSTRACT

A method is disclosed for creating and storing troubleshooting information for diagnosing one or more problems experienced in one or more completed voice calls that are carried by a packet-switched data network. After completion of a voice-over IP call, for example, first information representing a Layer 3 path of a packet flow of a completed call that has passed through the data network is created and stored. Second information representing a Layer 2 path of a packet flow of a completed call that has passed through the data network is also created and stored. From a phone call detail record database, one or more selected phone call detail records are retrieved, which are associated with the completed call from a database of phone call detail records for a large plurality of completed calls. Thus, the likely path of a troubled call is determined, and phone call detail records associated with key points in the path are located. The first information, second information, and selected phone call detail records are provided to a user for use in evaluating one or more problems experienced in the completed call. Based on this information, the user can troubleshoot the call and identify responsive action. In one embodiment, IP path segments of the voice over IP flow are identified and media termination points are identified for each path segment. Layer 2 and Layer 3 path tracing is performed for each IP segment of the voice over IP flow.

41 Claims, 5 Drawing Sheets

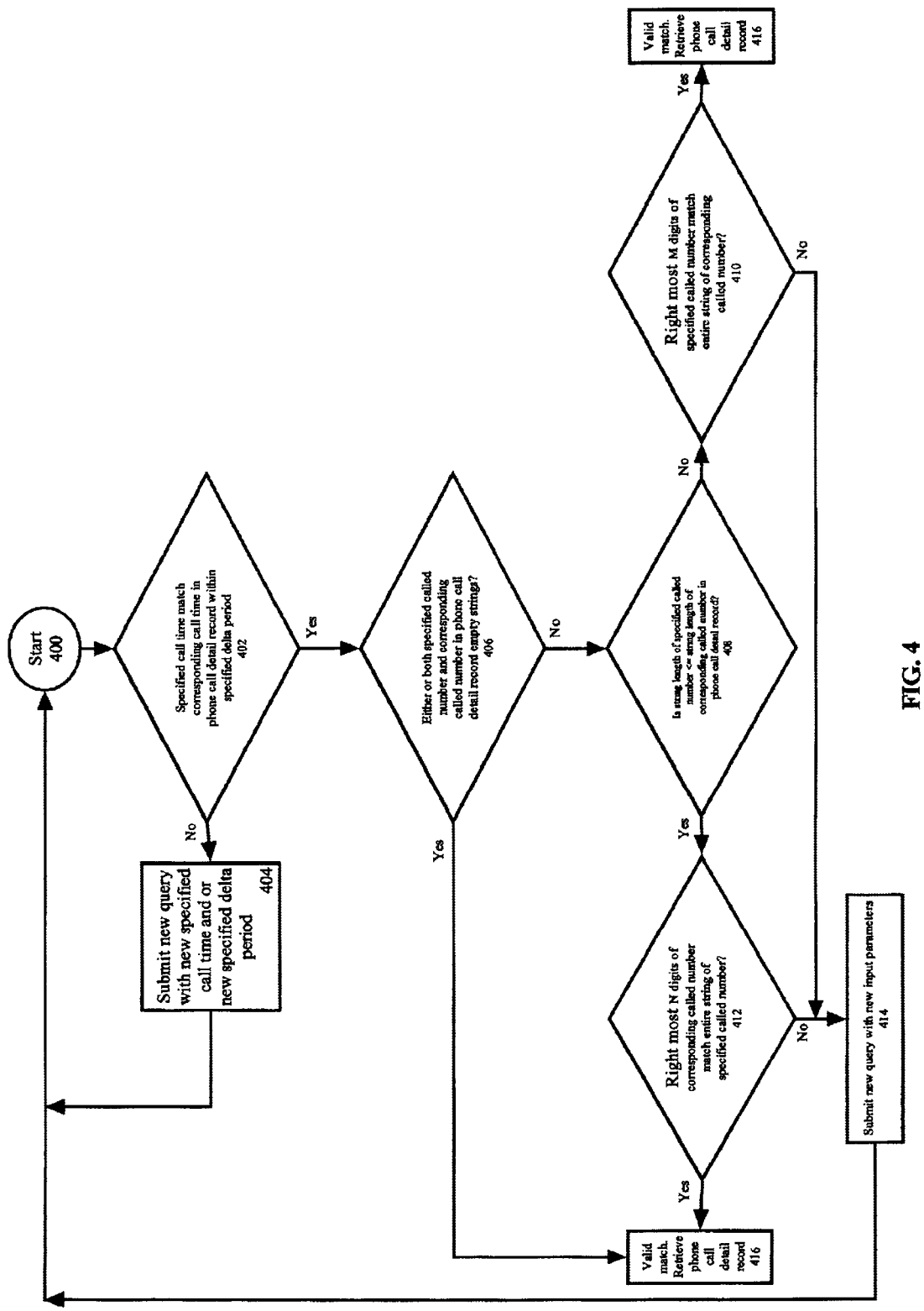

METHOD AND APPARATUS FOR DETERMINING TROUBLESHOOTING INFORMATION FOR COMPLETED CALLS IN A TELECOMMUNICATIONS NETWORK

FIELD OF INVENTION

The present invention generally relates to management of computer networks. The invention relates more specifically to determining troubleshooting information for packet flows representing voice calls that have been completed through an Internet Protocol network.

BACKGROUND OF THE INVENTION

Internet Protocol ("IP") telephony or voice over IP ("VoIP") refers to the transmission of voice calls or voice traffic in packets over one or more networks or internets that are based on IP. VoIP allows organizations to apply an existing IP network to new uses by carrying both voice and data traffic in the IP network. With VoIP, organizations that have extensive IP networks that span multiple cities or states by using Wide area Network ("WAN") links may avoid using public switched telephone networks ("PSTN") to carry telephone calls, thereby achieving significant cost savings. In addition, the organization gains increased control over the network that is carrying the calls. Further information about VoIP is available in numerous references, e.g., U. Black, "Voice Over IP" (Upper Saddle River, N.J.: Prentice-Hall, 2000).

However, the hardware and software that form an IP network may fail, introduce errors, or cause other problems when data traffic or voice traffic is sent over the IP network. For example, a phone at the originating end of a call may fail to make a connection with the destination phone for sending a VoIP flow due to a signaling phase problem. Other problems may include disruptions of a voice transmission or poor sound quality resulting from excessive packet latency or jitter. Latency is end-to-end delay in a transmission, and jitter is variation in the latency. Such problems may be caused by improper configuration of routers, switches, or other devices in the network. Thus, mechanisms are needed to isolate the source of a problem in the network in order to correct the problem.

One method of isolating the source of such problems ("troubleshooting") is to trace a path traversed by packets between two or more media end-points in an IP network that carries different media traffic such as voice, data and or video. Tracing a path traversed by packets between two or more media end-points in an IP network may be performed at different logical levels depending on the type of network communications that is of interest during the troubleshooting process.

In specifying a logical level for path tracing, the Open Systems Interconnection ("OSI") network reference model is useful. The OSI reference model divides the tasks of moving information between the network devices into groups of manageable tasks. Each group of tasks is assigned to one of seven named and numbered logical layers of the OSI reference model.

Tracing a path at Layer 3 (the Network layer) or at Layer 2 (the Data Link layer) is desirable to facilitate the troubleshooting process, however, there is no known way to carry out such path tracing in a way that addresses problems unique to voice call transmission in an IP network.

Layer 3 encompasses routing and related functions that enable media to move across an internetwork from a source device to a destination device. For example, Layer 3 may manage the routing of an IP packet from one Local Area Network ("LAN") to another. The path traversed by an IP packet at the Layer 3 level is referred to herein as a "Layer 3 path." A process of determining a path at Layer 3 is referred to herein as "Layer 3 path tracing." Layer 2 defines network and protocol characteristics, including physical addressing, network topology, sequencing of frames, and flow control. Determining a path at Layer 2 is herein referred to as "Layer 2 path tracing."

Based on the foregoing, there is a clear need for a mechanism that can trace a Layer 3 and Layer 2 path associated with a voice over IP flow in an IP network.

SUMMARY OF THE INVENTION

The foregoing needs, and other needs and objects that will become apparent for the following description, are achieved in the present invention, which comprises, in one aspect, a method for creating and storing troubleshooting information for diagnosing one or more problems experienced in one or more completed voice calls that are carried by a packet-switched data network.

After completion of a voice-over IP call, for example, first information representing a Layer 3 path of a packet flow of a completed call that has passed through the data network is created and stored. Second information representing a Layer 2 path of a packet flow of the completed call that has passed through the data network is also created and stored. From a database containing phone call information, one or more selected phone call detail records are retrieved, which are associated with the completed call. The database of phone call information contains detail records for a large plurality of completed calls. Thus, the likely path of a troubled call is determined, and phone call detail records associated with key points in the path are located.

The first information, second information, and selected phone call detail records are provided to a user for use in evaluating one or more problems experienced in the completed call. Based on this information, the user can troubleshoot the call and identify responsive action. In one embodiment, IP path segments of the voice over IP flow are identified and media termination points are identified for each path segment. Layer 2 and Layer 3 path tracing is performed for each IP segment of the voice over IP flow.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining troubleshooting information for packet flows representing voice calls that have been completed through an Internet Protocol network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

To illustrate the use of voice over IP ("VoIP"), assume that Acme Company has established an extensive IP network, and that Acme employee Allen makes a call on phone A to Acme employee Bob who is on phone B. Phone A may be an IP phone, which is a device that sends voice traffic in the form of IP packets directly to the IP network to which the IP phone is connected. Alternatively, Phone A may be a soft phone, which comprises software that is executed by a personal computer and emulates functions of an IP phone. Phone B is an analog phone connected to the IP network through a Station Gateway ("SG"). Station Gateways are VoIP gateways used for connecting analog phones to VoIP networks.

Assume that phone A and phone B reside in the same network subdomain or segment. A flow of VoIP packets between phone A and phone B is said to occur within a single VoIP segment when the VoIP flow between phone A and phone B does not pass through any intermediate Media Termination Gateway ("MTG"). However, if Acme's IP network is made up of multiple VoIP subdomains and Phone A and Phone B reside on different VoIP subdomains, then the VoIP flow between phone A and phone B is said to occur across multiple VoIP segments.

A VoIP subdomain is herein referred to as a "VoIP segment." Each VoIP segment is separated by one or more Media Termination Points, each of which may be a Media Termination Gateway or any device that terminates a VoIP flow. Examples of devices that may terminate a VoIP flow are soft phones, IP phones, Digital Signal Processors (DSPs), etc. Thus, a VoIP segment refers to any section of an organizational domain that is flanked by one or more Media Termination Points at each end of the section.

For example, phone A may reside in one VoIP segment and phone B may reside in a different VoIP segment. The VoIP segments may be separated by one or more Media Termination Gateways. Alternatively, the VoIP segments may be separated by one or more Trunk Gateways ("TG") and a PSTN network. A Trunk Gateway is a type of Media Termination Gateway that is used to connect an IP network to a PSTN network.

Figure 1:
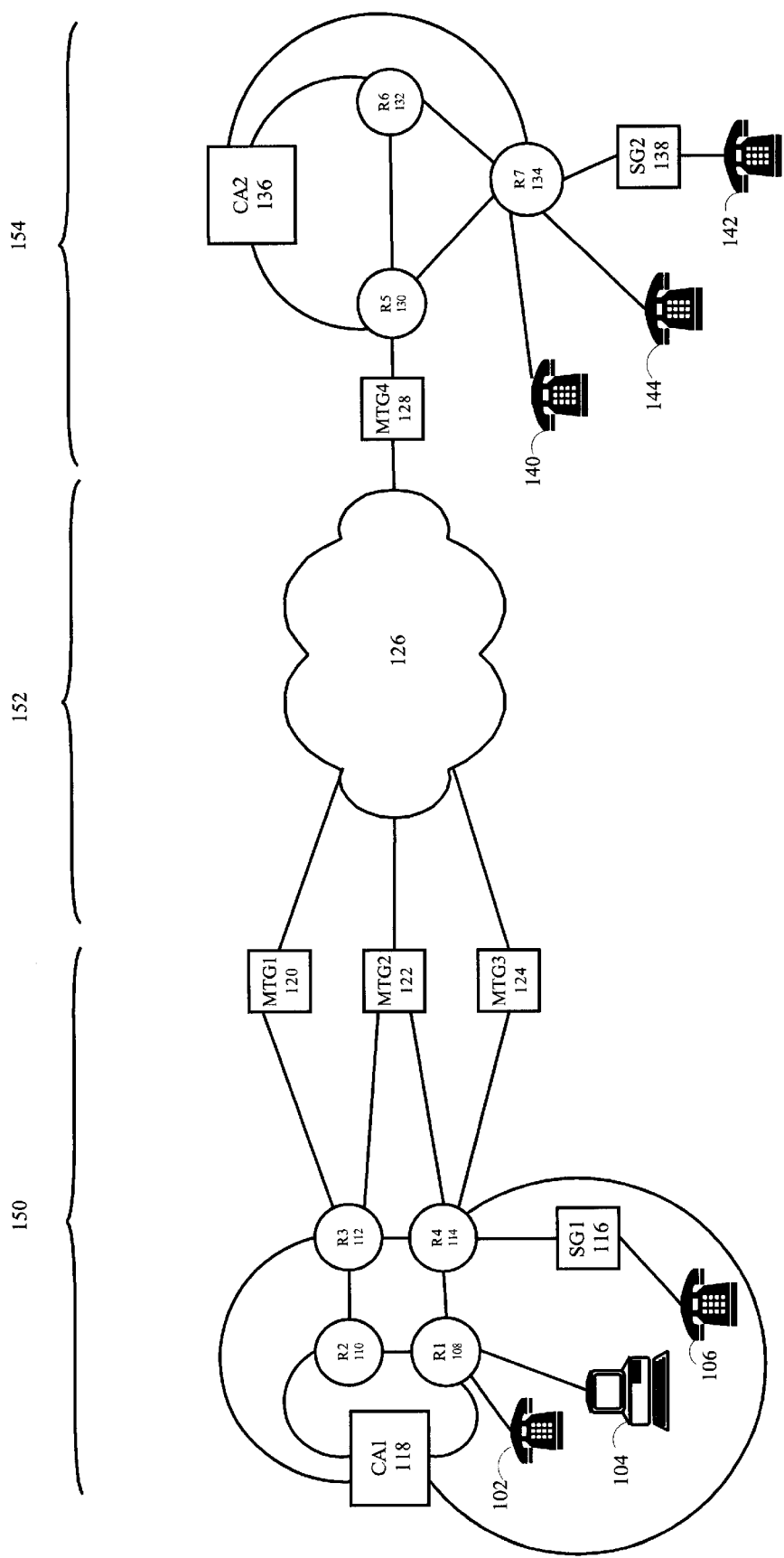
FIG. 1 is a block diagram that illustrates an overview of a voice over IP ("VoIP") system 100.

FIG. 1 is a block diagram of an example VoIP system 100 comprising multiple VoIP segments 150, 154. Assume that VoIP Segment 150 and VoIP Segment 154 are in the domain of Acme Company and are separated by PSTN 152. Since PSTN 152 is in the domain of the telephone company, Acme cannot manage or obtain information about devices within the PSTN, and so it is considered a "black box," i.e., unusable for the purpose of in troubleshooting.

VoIP Segment 150 includes routers 108, 110, 112, 114. The routers communicate with Call Agent 118. IP phone 102 and soft phone 104 are coupled to router 108. Analog phone 106 is coupled to router 114 by Station Gateway 116. VoIP Segment 150 also includes Media Termination Gateways 120, 122, 124. PSTN Network 152 is represented by PSTN cloud 126. VoIP Segment 154 includes Media Termination Gateways 128 and routers 130, 132, 134. The routers communicate with Call Agent 136. IP phones 140, 144 are connected to router 134 and analog phone 142 is connected to router 134 by Station Gateway 138.

Figure 2:
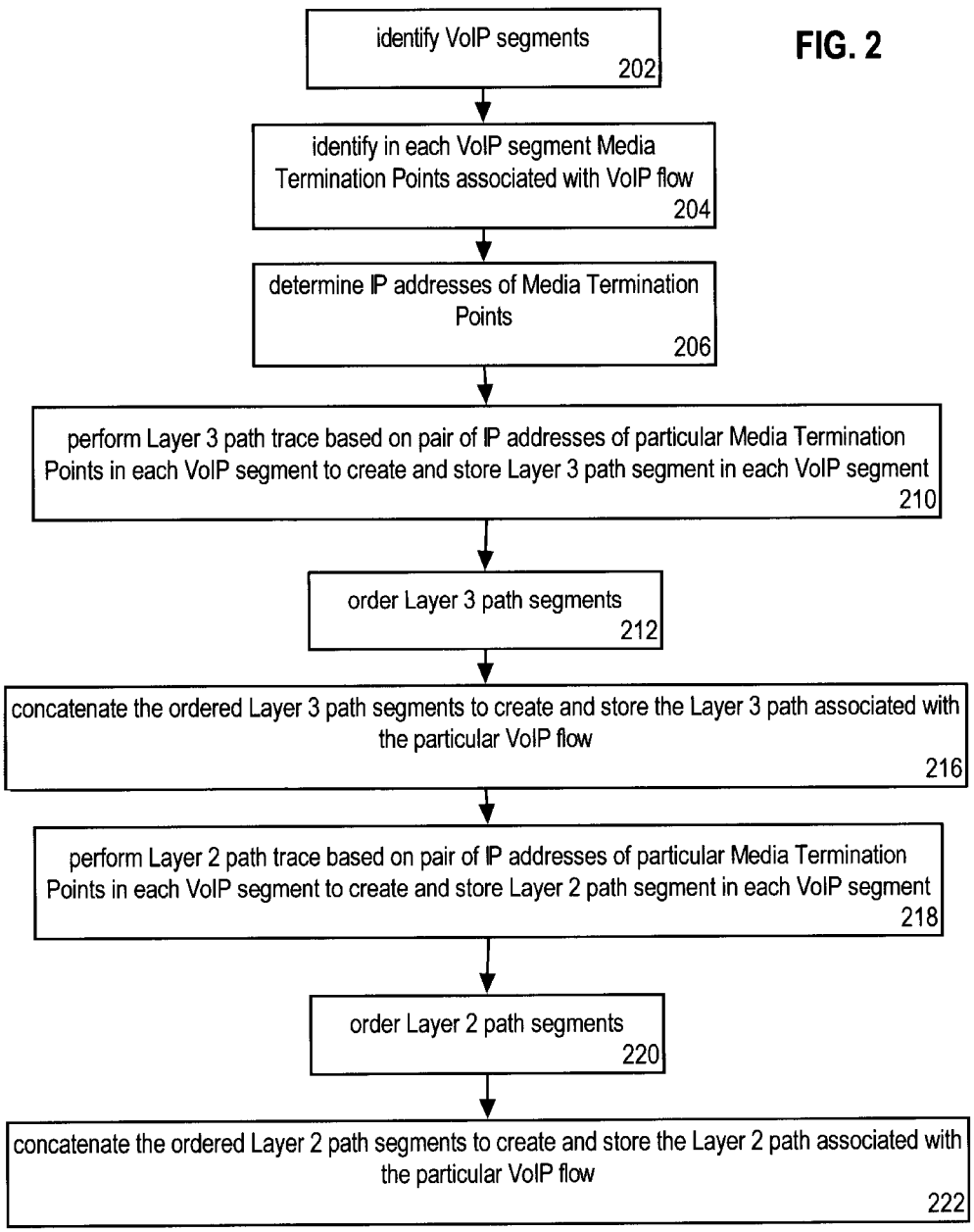
FIG. 2 is a flowchart that illustrates a high level overview of one embodiment of a method for performing diagnostic processes after completion of a VoIP call flow in a network.

FIG. 2 is a flowchart that illustrates one embodiment of a process for determining troubleshooting information for completed calls in a telecommunications network.

For purposes of illustrating an example, FIG. 2 will be described with reference to FIG. 1. However, the process of FIG. 2 is applicable to any packet switched network that can carry voice calls. Referring to FIG. 1, assume that a call is made from soft phone 104 in VoIP Segment 150 to analog phone 142 in VoIP Segment 154. At some point after the call is terminated, a network administrator or a network management process needs to obtain troubleshooting information relating to the call.

Referring now to FIG. 2, at block 202, one or more VoIP segments are identified in the network that carries the call. For example, block 202 may involve examining VoIP system 100 of FIG. 1 and determining that the VoIP segments are VoIP Segment 150, 154.

At block 204, one or more Media Termination Points associated with a particular VoIP flow are identified in each VoIP segment. For example, block 204 may involve identifying the Media Termination Points associated with the VoIP flow from soft phone 104 to analog phone 142 that are in VoIP Segment 150 and VoIP Segment 154 respectively.

At block 206 of FIG. 2, the IP addresses corresponding to the Media Termination Points that were identified at block 204 at each VoIP segment are determined. At block 210, a Layer 3 path trace is performed for each pair of IP addresses corresponding to the pair of Media Termination Points at each VoIP segment, which results in creating and storing information representing a Layer 3 path segment corresponding to each VoIP segment. At block 212 the Layer 3 path segments are ordered sequentially to reflect the actual path traversal of the particular VoIP flow. At block 216, the ordered Layer 3 segments are concatenated to result in creating and storing information representing the Layer 3 path associated with the particular VoIP flow.

At block 218, a Layer 2 path trace is performed at each VoIP segment based on the previously-obtained Layer 3 information or the pair of IP addresses corresponding to the pair of Media Termination Points at each VoIP segment. At block 220 the Layer 2 path segments are ordered in a sequential manner to reflect the actual path traversal of the particular VoIP flow. At block 222, the ordered Layer 2 segments are concatenated to create the Layer 2 path associated with the particular VoIP flow. The Layer 2 information is stored.

Referring again to FIG. 1, if a Wide Area Network ("WAN") that is within the domain of Acme Company is used in the position of PSTN 126, then at block 202 of FIG. 2, the WAN is identified as one of the VoIP segments. Typically, VoIP packets pass through a Media Termination Gateway, e.g., MTG2 122, before entering the WAN. WAN links may have low bandwidth and the VoIP packets may undergo compression at the Media Termination Gateway. Similarly, when the VoIP packets emerge from the WAN cloud, the VoIP packets are decompressed at the Media Termination Gateway, e.g., MTG 128, which is located at a point of exit from the WAN.

Referring to block 204, each VoIP segment may have multiple Media Termination Points, but each VoIP segment has only one pair of Media Termination Points associated with a particular VoIP flow. Thus, within a single VoIP segment, there may be several pairs of Media Termination Points, where each pair is associated with a different VoIP flow. For example, assume that in VoIP Segment 150 of FIG. 1, one of the Termination Points associated with the VoIP flow from soft phone 104 to analog phone 142 is Media Termination Gateway 122. The other Media Termination point in VoIP segment 150, and which is associated with the VoIP flow from soft phone 104 to analog phone 142 is soft phone 104 because the soft phone is the source of the VoIP flow. Thus, the pair of Termination Points in VoIP segment 150 associated with the VoIP flow from soft phone 104 to analog phone 142 are soft phone 104 and Media Termination Gateway 122.

Similarly, in VoIP Segment 154, the Termination Points associated with the VoIP flow from soft phone 104 to analog phone 142 are Media Termination Gateway 128 and Station Gateway 138. Further details of steps involved in blocks 202, 204, 206 of FIG. 2 are described with reference to FIG. 3 and FIG. 4.

Referring to block 210, before a Layer 3 path trace is performed, the correct packet precedence is determined if the precedence field of VoIP packets in the VoIP flow was set to a high priority value. The precedence field determines the transmission priority given to the VoIP packet as it is transmitted through the network. A VoIP packet may be given a higher transmission priority by appropriately setting the Type of Service ("TOS") field in the packet header. When a router in the network encounters a VoIP packet that has its precedence value set to a high priority value, the router gives the VoIP packet priority treatment in the router's routing plan. The priority treatment may or may not involve routing the VoIP packet along a route that is different from the route used by IP packets with lower transmission priority. Thus, before a Layer 3 path is performed, the correct precedence is determined in case the priority treatment involves routing the VoIP packet along a route that is different from the route used by IP packets with lower transmission priority.

The Layer 3 path trace that is carried out at block 210 can be performed using the "traceroute" computer program or any other mechanism that is capable of accomplishing the same task. The "traceroute" software program is supported by UNIX-based network computers; an equivalent for Windows-based computers is "tracert". Both traceroute and tracert create and store information defining the path or route comprising specific gateway computers or routers at each hop through the computer network between a source device and the destination device. In a packet-switching network, a hop is the next intermediate gateway that a packet visits on its way to its destination.

The traceroute program works by sending a packet of data, e.g., using ICMP, to the destination end-station. The packet includes a time limit value ("time to live") that is selected so as to be exceeded by the first gateway that receives the packet. The gateway returns a Time Exceeded message. The traceroute program increases the time limit value and resends the packet so that it will reach the next gateway in the path to the destination.

One method of Layer 3 path tracing is disclosed in co-pending application Ser. No. 09/439,153, entitled "DETERMINING A PATH THROUGH A MANAGED NETWORK," filed Nov. 12, 1999, and naming as inventors Mehryar Garakani et al., the entire disclosure of which is hereby incorporated by reference as if fully set forth herein.

Referring to block 218, a method of Layer 2 path tracing is disclosed in co-pending application Ser No. 09/524,725, entitled "A METHOD OF DETERMINING A DATA LINK PATH IN A MANAGED NETWORK," filed Mar. 14, 2000, and naming as inventor Mehryar Garakani, the entire disclosure of which is hereby incorporated by reference as if fully set forth herein. Another method of Layer 2 path determination is disclosed in co-pending application Ser. No. 09/585,709, entitled "A METHOD AND APPARATUS FOR DETERMINING A LAYER 2 PATH IN A SWITCHED NETWORK", filed May 31, 2000, and naming as inventors Clare Chu et al., the entire disclosure of which is hereby incorporated by reference as if fully set forth herein.

Referring to blocks 212, 220, ordering Layer 3 and Layer 2 path segments in a sequential manner that reflects the actual path traversal of the particular VoIP flow may be based on information on the topology of the network and or information supplied by the user.

Voice Over IP Path Tracing

De Facto Calls

In one embodiment of the invention, diagnostics are performed for de facto VoIP calls. De facto calls are calls for which phone call detail records have been generated. A phone call detail record may be generated for a particular VoIP call immediately after initiation of the VoIP call, or at the termination of the VoIP call. Information in a phone call detail record may be used as long as no routing changes occur in the VoIP network. Routing changes may occur due to changes in the routing algorithm, or in spanning tree information for the network. Thus, phone call detail records of a de facto call have a finite period of usability. Thus, diagnostic information determined for a de facto call is useful only if performed within the usability period of the phone call detail record associated with the de facto call. Typically, routing changes in a network occur infrequently. Thus, the usability period of a phone call detail record associated with a given de facto call may be hours or days.

Call Agents

A Call Agent is a call manager that manages VoIP flows. Functions of a Call Agent include: 1) communicating with VoIP phones or Station Gateways in the case of analog phones on the IP network; 2) conducting the signaling phase of the VoIP flow; 3) establishing a VoIP connection with the destination phone; 4) creating and storing a phone call detail record associated with the VoIP flow; 5) communicating with the central management component of the VoIP network. In one embodiment, one Call Agent is provided for each VoIP segment. An example of a Call Agent is Cisco Call Manager ("CCM"), commercially available through Cisco Systems, Inc., San Jose, Calif.

Each phone call detail record that is associated with a particular VoIP flow, and which is created by the call agent in each VoIP segment may include the following information: 1) directory number or extension number of the source phone, 2) directory number or extension number of the destination phone, 3) Media Termination Points in the VoIP segment associated with the VoIP flow, 4) IP addresses of the Media Termination Points in the VoIP segment associated with the VoIP flow; 5) time stamp associated with the VoIP flow, 6) the elapsed time associated with the VoIP flow. An example of phone call detail records are Call Detail Records ("CDRs"). CDRs having this information are created by the Cisco Call Manager. CDRs are described in http://www.cisco.com/warp/public/788/appendix a.html.

Each Call Agent also resolves path ambiguities that may be associated with Media Termination Gateways or that may result from multiple line appearances of a phone. Media Termination Gateway ambiguities result from the presence of multiple Media Termination Gateways in a given VoIP segment. The nature of diagnosing de facto calls creates such an ambiguity because, but for the creation and storage of phone call detail records by the Call Agent at the time the VoIP flow occurred, there is no convenient method of determining which Media Termination Gateway was used by a VoIP packet at the time the VoIP packet traversed through the VoIP segment. Media Termination Gateways in the VoIP segments are chosen based on routing plans configured on each Call Agent as well as the amount of VOIP traffic already on each gateway at the time the particular VoIP flow occurred. Routing plans may have changed by the time a decision is made to diagnose the de facto call. The trunk loading capacity may also be different.

For example, referring to FIG. 1, VoIP Segment 150 has multiple Media Termination Gateways 120, 122, 124. Assume that IP phone 102 dials the directory number of IP phone 140. Also, assume that at the time IP phone 102 dials the directory number of IP phone 140, Call Agent 118 is configured to route calls that are from IP phone 102 and destined for IP phone 140 through Media Termination Gateway 122. Call Agent 118 will correctly record Media Termination Gateway 122 as the Media Termination Point traversed by the VoIP flow initiating from IP phone 102 and destined for IP phone 140.

Path ambiguity may also arise from the use of phones having multiple line appearances, i.e., phones that appear to have more than one line. For example, referring to FIG. 1, assume that IP phone 102 dials the directory number of IP phone 140. Assume that in response to the dialing, both IP phone 140 and IP phone 144 are configured to ring awaiting someone to receive the VoIP call from IP phone 102. IP phone 144 is said to be a multi-line appearance phone because it is configured to receive VoIP flows destined for it as well as VoIP flows that are destined for another IP phone. For example, the phone of an administrative assistant may be configured to receive VoIP flows destined for the administrative assistant as well as VoIP flows destined for a manager of the administrative assistant. The Call Agent would correctly record the IP address of the phone that establishes a connection with the source phone. Thus, if IP phone 144 establishes a connection with IP Phone 102, then Call Agent 136 will record IP phone 144 as the Media Termination Point in VoIP Segment 154 and will also record the corresponding IP address.

Network Management

In one embodiment, a network management element communicates with Call Agents and provides a user interface to receive input from a user. A discovery mechanism is used to identify VoIP segments by discovering all the Media Termination Points in the organizational domain. An example of a discovery mechanism is Cisco Discovery Protocol ("CDP"), which is used in certain network management products commercially available from Cisco Systems, Inc. CDP is a low-level communication protocol that can help identify how devices are linked in a network. When a device supporting CDP sends a message to another device, the message includes a packet that contains its IP address and an interface descriptor. The interface descriptor represents the logical name of the port from which the message was sent. The information is recorded at the receiving device and may be used to determine how two devices are physically connected.

Figure 3:
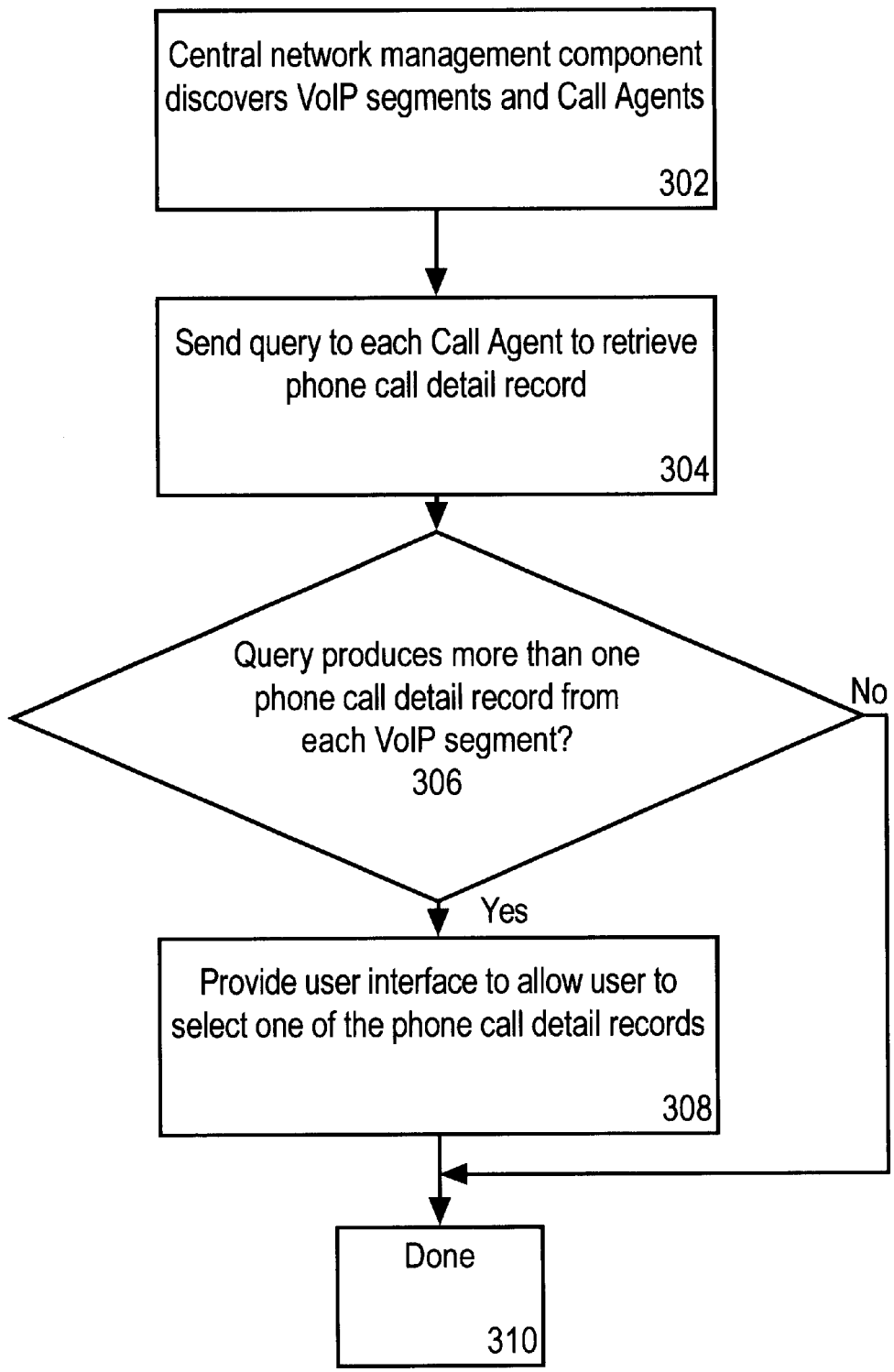
FIG. 3 is a flowchart that illustrates identifying VoIP segments and identifying Media Termination Points and corresponding IP addresses for a particular VoIP flow.

FIG. 3 is a flowchart that a process of identifying VoIP segments and identifying Media Termination Points and corresponding IP addresses for a particular VoIP flow. For purposes of illustrating an example, FIG. 3 is described herein with reference to FIG. 1, however, the process of FIG. 3 is applicable to any other packet-switched data network that carries voice calls.

At block 302 of FIG. 3, the network management element discovers the VoIP segments and Call Agents. At block 304, the network management element sends a query to each Call Agent to retrieve phone call detail records.

At block 306, the network management element determines whether each Call Agent sends more than one set of phone call detail records in response to the query. If each Call Agent sends only one phone call detail record, then the process of selecting the relevant phone call detail record is complete at block 310. Otherwise, if each Call Agent sends more than one phone call detail record, then at block 308, the network management element provides a user interface to allow the user to select the relevant phone call detail record.

Query Processing

At block 304, the network management element sends a query to each Call Agent to retrieve phone call detail records associated with a particular VoIP flow. The query that is sent to each Call Agent comprises input parameters specified by a user, e.g., through a user interface. The input parameters preferably include a specified called number, a specified call time, and a specified delta time period that reflects an uncertainty period with respect to the call time.

The specified called number is the directory number or extension number of the destination phone. In one embodiment, the specified call time may be the user's estimate of the time when a connection was made between the source phone and the destination phone. In another embodiment, the specified call time may be the user's estimate of the time of disconnection between the source phone and the destination phone. The specified delta time period serves to approximate the specified call time. The more accurate the specified call time, the greater the likelihood of retrieving the correct phone call detail record associated with the particular VoIP flow. Submitting a large value of the specified delta time period in the query may produce multiple phone call detail records that satisfy the query. A user interface may be provided to allow the user to select the correct phone call detail record when multiple call detail records that satisfy the query.

Figure 4:
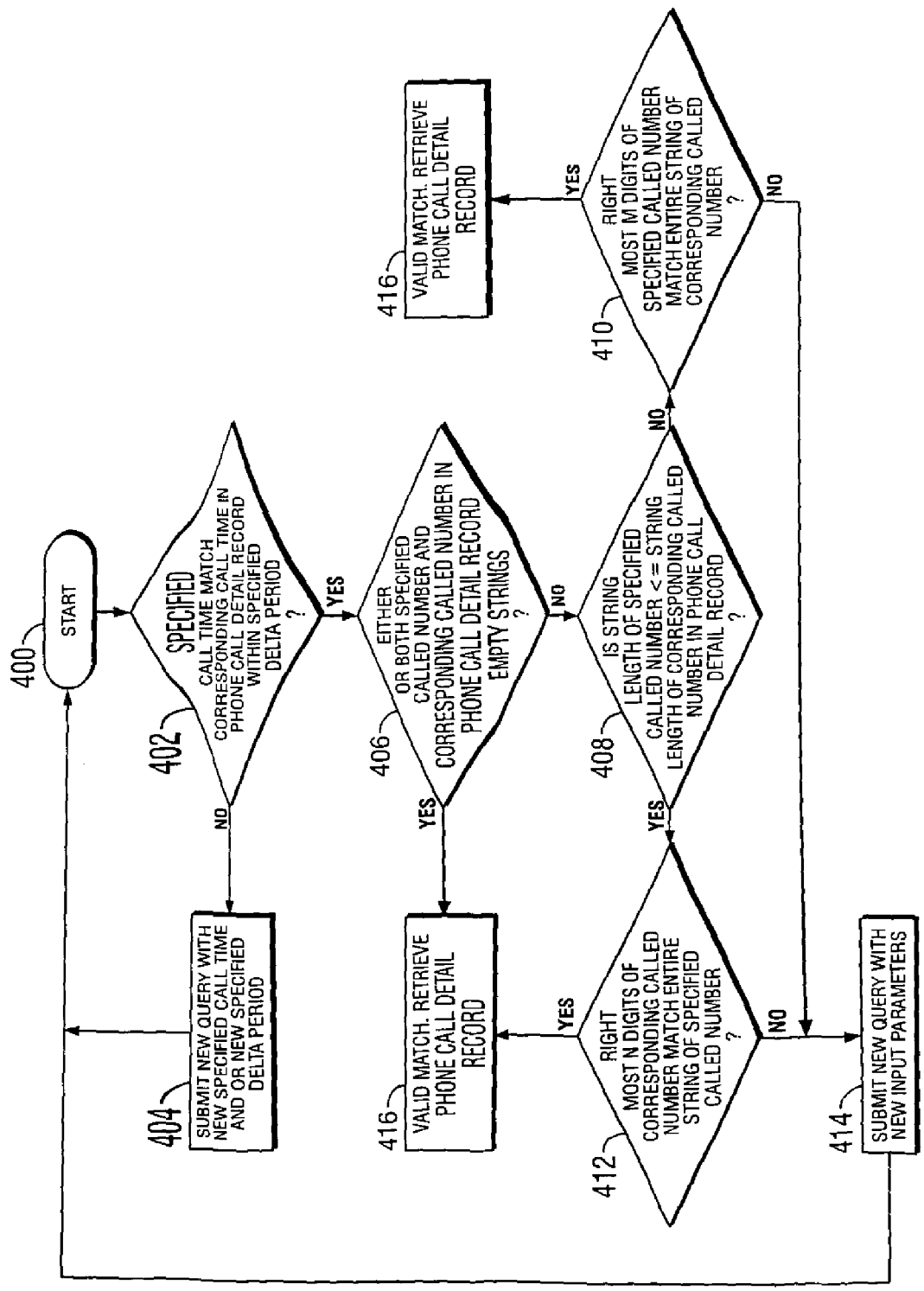
FIG. 4 is a flowchart that illustrates a method of processing a query.

FIG. 4 is a flowchart that illustrates a method of processing a query that is submitted to each Call Agent in order to retrieve the phone call detail record associated with a particular VoIP flow.

In one embodiment, at block 402, the Call Agent determines whether the specified call time matches a corresponding call time in one or more phone call detail records that were created within the specified delta period. If the Call Agent determines that the specified call time does not match the corresponding call time in the phone call detail record within the specified delta period, then at block 404, a new query is submitted with a new specified call time and or new specified delta period.

Otherwise, if the Call Agent determines that the specified call time matches the corresponding call time in the phone call detail record within the specified delta period, then at block 406, the Call Agent determines whether either or both the specified called number and the corresponding called number in the phone call detail record are valid. For example, the specified called number and the corresponding called number may be received in the form of string variable values, and block 406 may involve determining whether the values are empty strings. Alternatively, other forms of data representation may be used, and may be tested for null values, etc.

If the Call Agent determines that either or both the specified called number and the corresponding called number in the phone call detail record are empty strings, then such a determination is considered a valid match. Thus, at block 416, the query process is complete, and the Call Agent retrieves the phone call detail record. Otherwise, if the Call Agent determines that either or both the specified called number and the corresponding called number in the phone call detail record contain values (e.g., they are not empty strings), then at block 408, the Call Agent determines whether the string length of the specified called number is less than or equal to the string length of the corresponding called number in the phone call detail record. For the purpose of explanation, assume that N is an integer and is the string length of the specified called number. M is an integer and is the string length of the corresponding called number in the phone call detail record.

If the Call Agent determines that the string length of the specified called number is less than or equal to the string length of the corresponding called number in the phone call detail record, then at block 412, the Call Agent determines whether the rightmost N digits of the corresponding called number in the phone call detail record match the entire string of the specified called number. If the rightmost N digits of the corresponding called number in the phone call detail record match the entire string of the specified called number, then control passes to block 416. Otherwise, if at block 412, the Call Agent determines that the rightmost N digits of the corresponding called number in the phone call detail record does not match the entire string of the specified called number, then at block 414, a new query is submitted with new input parameters.

If at block 408, the Call Agent determines that the specified called number is greater than the corresponding called number in the phone call detail record, e.g., by using a string comparison function, then at block 410, the Call Agent determines whether the rightmost M digits of the specified called number match the entire corresponding called number in the phone call detail record. If so, then a valid match has occurred and control passes to block 416. Otherwise, control passes to block 414, in which a new query with new input parameters is submitted.

The Call Agent determines whether either or both the specified called number and the corresponding called number in the phone call detail record are empty strings, at block 406, for the reason that an empty string is considered a match by default. An empty string is considered a match in order to provide flexibility in the query processing. However, when either or both the specified called number and the corresponding called number in the phone call detail record are empty strings, the query process may result in the retrieval of multiple phone call detail records. Referring to block 308 of FIG. 3, a user interface may be provided to allow the user to select the correct phone call detail record.

The specified called number or the corresponding called number in the phone call detail record may be a superstring, a substring of the superstring, or an empty string. The superstring may include a country code, area code, trunk identification digits, and extension digits. An example of a superstring is "1.408.414.1080". The country code "1" is followed by the area code "408", trunk identification digits "414" and extension digits "1080". A substring is any subset of the superstring, e.g., "414-1080". An empty string has a null value. The matching criteria described with reference to blocks 406, 408, 410, 412 of FIG. 4 produces valid matches when the string of specified called number does not exactly match the string of the corresponding called number in the phone call detail record. For example, the matching criteria will produce valid matches in the following cases:

the string of the specified called number is a substring of the string of the corresponding called number in the phone call detail record;

the string of the specified called number is a superstring of the string of the corresponding called number in the phone call detail record;

the string of the specified called number is equal to the string of the corresponding called number in the phone call detail record;

the string of the specified called number and the string of the corresponding called number in the phone call detail record are both empty strings;

the string of the specified called number is an empty string and the string of the corresponding called number in the phone call detail record is any non-empty string;

the string of the corresponding called number in the phone call detail record is an empty string and the string of the specified called number is any non-empty string.

Hardware Overview

Figure 5:
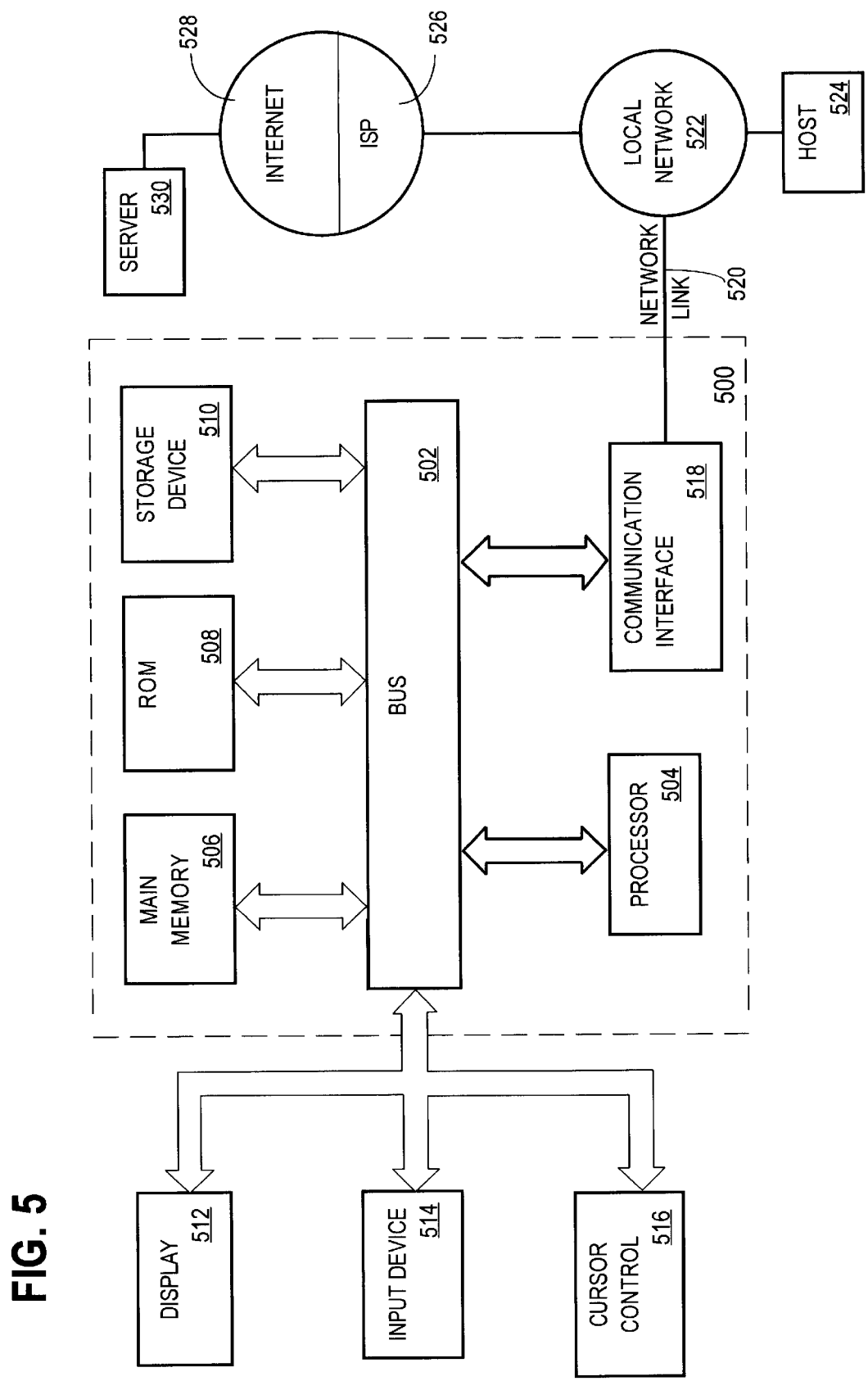
FIG. 5 is a block diagram that illustrates a computer system upon which an embodiment may be implemented.
Figure 1:
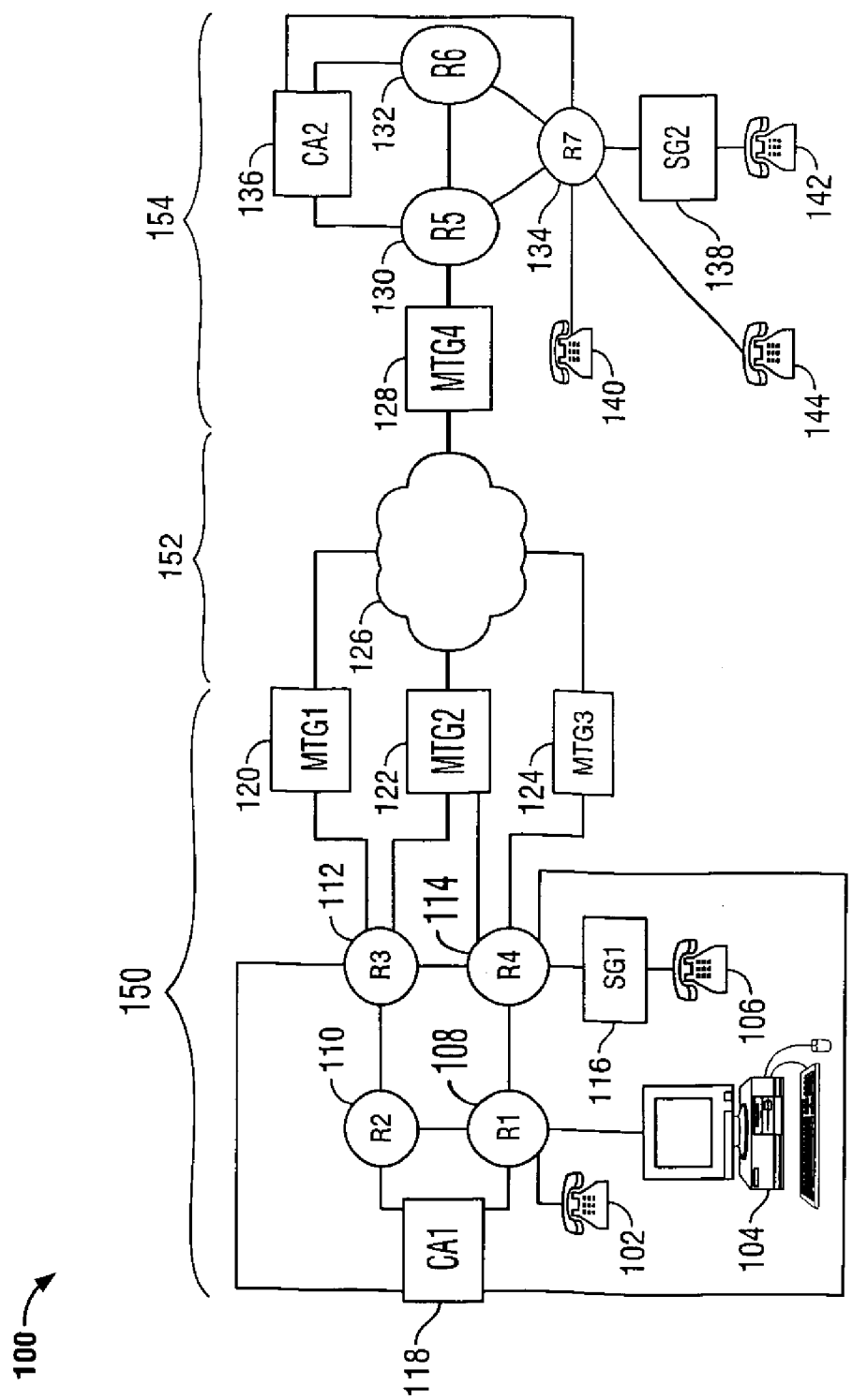

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for determining troubleshooting information for packet flows representing voice calls that have been completed through an Internet Protocol network. According to one embodiment of the invention, performing determining troubleshooting information for packet flows representing voice calls that have been completed through an Internet Protocol network is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for performing determining troubleshooting information for packet flows representing voice calls that have been completed through an Internet Protocol network as described herein.

The received code may be executed by processor 504 as it is received, and/or stored in storage device 510, or other non-volatile storage for later execution. In this manner, computer system 500 may obtain application code in the form of a carrier wave.

Scope

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

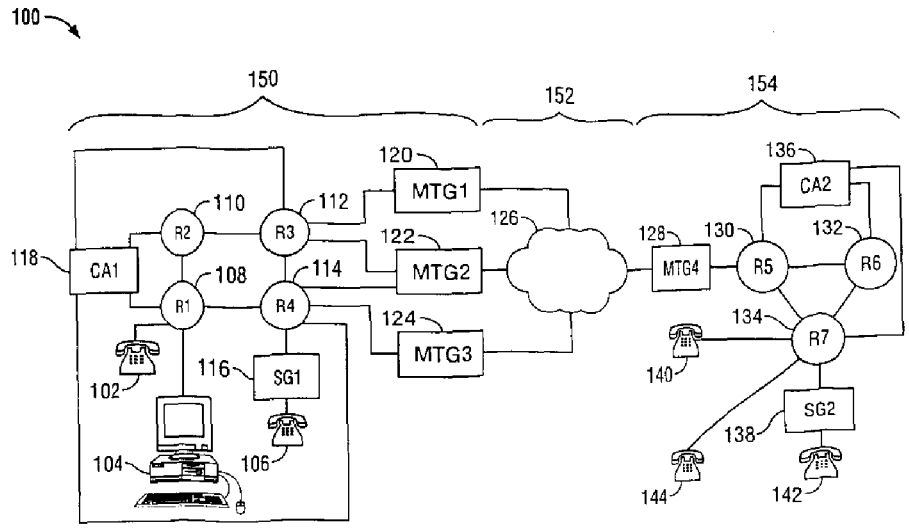

What is claimed is:

1. A method of creating and storing troubleshooting information for diagnosing one or more problems experienced in one or more completed voice calls that are carried by a packet-switched data network, the method comprising the steps of:

creating and storing first information representing a Layer 3 path of a packet flow of a completed call that has passed through the data network;

creating and storing second information representing a Layer 2 path of a packet flow of the completed call that has passed through the data network;

retrieving one or more selected phone call detail records that are associated with the completed call from a database of phone call detail records for a large plurality of completed calls; and providing the first information, second information, and selected phone call detail records to a user for use in evaluating one or more problems experienced in the completed call.

2. A method as recited in claim 1, further comprising the steps of:

identifying one or more voice over Internet Protocol (IP) segments in the data network;

identifying one or more media termination points that are associated with the packet flow in each voice over IP segment;

mapping each media termination point to a corresponding media termination point IP address in the network.

3. A method as recited in claim 2, wherein the step of creating and storing first information further comprises the steps of:

performing a Layer 3 path tracing for a pair of media termination point IP addresses in each voice over IP segment to create a Layer 3 path segment associated with the packet flow in each voice over IP segment;

ordering the Layer 3 path segments in an order that reflects an actual Layer 3 path traversal of the packet flow through the network for the completed call;

concatenating the Layer 3 path segments in the order reflecting the actual Layer 3 path traversal of the packet flow to create the Layer 3 path associated with the packet flow.

4. A method as recited in claim 2, wherein the step of creating and storing second information further comprises the steps of:

performing a Layer 2 path tracing for the pair of media termination point IP addresses in each voice over IP segment to create a Layer 2 path segment associated with the packet flow in each voice over IP segment;

ordering the Layer 2 path segments in an order reflecting an actual Layer 2 path traversal of the packet flow in the network; and concatenating the Layer 2 path segments in the order reflecting the actual Layer 2 path traversal of the packet flow to create the Layer 2 path associated with the packet flow.

5. The method as recited in claim 4, wherein ordering the Layer 2 path segments in an order reflecting an actual Layer 2 path traversal of the packet flow in the network comprises using network topology information to determine a probable order of the path segments.

6. The method as recited in claim 2, wherein identifying media termination points associated with the packet flow in each voice over IP segment comprises:

creating and storing at each voice over IP segment a phone call detail record associated with the packet flow; and retrieving at each voice over IP segment the phone call detail record associated with the voice over IP flow.

7. The method as recited in claim 3, wherein ordering the Layer 3 path segments in an order reflecting an actual Layer 3 path traversal of the packet flow in the network comprises using network topology information to determine a probable order of the path segments.

8. The method as recited in claim 6, wherein creating and storing at each voice over IP segment a phone call detail record associated with the packet flow comprises creating and storing a phone call detail record that includes a calling number value, a called number value, a call connection time value, a call termination time value, and one or more values identifying media termination point IP addresses.

9. The method as recited in claim 8, wherein the specified call time value represents a connect time associated with the packet flow.

10. The method as recited in claim 8, wherein the specified call time value represents a disconnect time associated with the packet flow.

11. The method as recited in claim 6, wherein retrieving the phone call detail record associated with the packet flow comprises submitting to a call agent at each voice over IP segment a query for the phone call detail record, wherein the query comprises specified query parameters that are associated with the packet flow and that are selected from among a specified called number value, a specified call time value, and a specified delta time period value reflecting an uncertainty period in the call time.

12. A method as recited in claim 11, wherein retrieving the phone call detail record further comprises the steps of:

determining whether the specified called number matches a corresponding called number in the phone call detail record and whether the specified call time matches within the uncertainty period a corresponding call time in the phone call detail record; and selecting the phone call detail record when the specified called number matches the corresponding called number in the phone call detail record and the specified call time matches within the uncertainty period the corresponding call time in the phone call detail record.

13. A method as recited in claim 12, further comprising the step of providing a user interface to allow the user to select one phone call detail record when more than one phone detail records match the specified query parameters.

14. A method as recited in claim 12, wherein determining whether the specified called number matches a corresponding called number in the phone call detail record comprises determining that the specified called number matches the corresponding called number in the phone call detail record when the specified called number is an empty string.

15. The method as recited in claim 12, wherein determining whether the specified called number matches a corresponding called number comprises determining that the specified called number matches the corresponding called number in the phone detail record when the corresponding called number in the phone call detail record is an empty string.

16. The method as recited in claim 12, wherein determining whether the specified called number matches a corresponding called number comprises determining that the specified called number matches the corresponding called number in the phone call detail record if N right most digits of the corresponding called number in the phone call detail record match the entire specified called number when neither the specified called number nor the corresponding called number is an empty string and when the specified called number has N digits, wherein N is less than or equal to the number of digits in the corresponding called number in the phone call detail record.

17. The method as recited in claim 12, wherein determining whether the specified called number matches a corresponding called number in the phone call detail record comprises determining that the specified called number matches the corresponding called number in the phone call detail record if M right most digits of the specified called number match the entire corresponding called number in the phone call detail record when neither the specified called number nor the corresponding called number is an empty string and when the corresponding called number in the phone call detail record has M digits, wherein M is less than the number of digits in the specified called number.

18. A method for diagnosing a voice over IP flow in an IP network, the method comprising the steps of:

identifying voice over IP segments in the IP network;

identifying media termination points associated with the voice over IP flow in each voice over IP segment;

mapping each media termination point to a corresponding media termination point IP address;

performing a Layer 3 path tracing for a pair of media termination point IP addresses in each voice over IP segment to create a Layer 3 path segment associated with the voice over IP flow in each voice over IP segment;

ordering the Layer 3 path segments in a sequential order reflecting an actual Layer 3 path traversal of the voice over IP flow in the network;

concatenating the Layer 3 path segments in the order reflecting the actual Layer 3 path traversal of the voice over IP flow to create the Layer 3 path associated with the voice over IP flow;

performing a Layer 2 path tracing for the pair of media termination point IP addresses in each voice over IP segment to create a Layer 2 path segment associated with the voice over IP flow in each voice over IP segment;

ordering the Layer 2 path segments in the sequential order reflecting an actual Layer 2 path traversal of the voice over IP flow in the network; and concatenating the Layer 2 path segments in the order reflecting the actual Layer 2 path traversal of the voice over IP flow to create the Layer 2 path associated with the voice over IP flow.

19. A computer-readable medium carrying one or more sequences of instructions for creating and storing troubleshooting information for diagnosing one or more problems experienced in one or more completed voice calls that are carried by a packet-switched data network, which instructions, when executed by one or more processors, cause the one or more processors to carry out the steps of:

creating and storing first information representing a Layer 3 path of a packet flow of a completed call that has passed through the data network;

creating and storing second information representing a Layer 2 path of a packet flow of the completed call that has passed through the data network;

retrieving one or more selected phone call detail records that are associated with the completed call from a database of phone call detail records for a large plurality of completed calls; and providing the first information, second information, and selected phone call detail records to a user for use in evaluating one or more problems experienced in the completed call.

20. A computer-readable medium as recited in claim 19, further comprising instructions which, when executed by the one or more processors, cause the one or more processors to carry out the steps of:

identifying one or more voice over Internet Protocol (IP) segments in the data network;

identifying one or more media termination points that are associated with the packet flow in each voice over IP segment;

mapping each media termination point to a corresponding media termination point IP address in the network.

21. A computer-readable medium as recited in claim 20, wherein the instructions for carrying out the step of creating and storing first information further comprise instructions for carrying out the steps of:

performing a Layer 3 path tracing for a pair of media termination point IP addresses in each voice over IP segment to create a Layer 3 path segment associated with the packet flow in each voice over IP segment;

ordering the Layer 3 path segments in an order that reflects an actual Layer 3 path traversal of the packet flow through the network for the completed call;

concatenating the Layer 3 path segments in the order reflecting the actual Layer 3 path traversal of the packet flow to create the Layer 3 path associated with the packet flow.

22. The computer-readable medium as recited in claim 21, wherein ordering the Layer 3 path segments in an order reflecting an actual Layer 3 path traversal of the packet flow in the network comprises using network topology information to determine a probable order of the path segments.

23. A computer-readable medium as recited in claim 20, wherein the instructions for creating and storing second information further comprise instructions for carrying out the steps of:

performing a Layer 2 path tracing for the pair of media termination point IP addresses in each voice over IP segment to create a Layer 2 path segment associated with the packet flow in each voice over IP segment;

ordering the Layer 2 path segments in an order reflecting an actual Layer 2 path traversal of the packet flow in the network; and concatenating the Layer 2 path segments in the order reflecting the actual Layer 2 path traversal of the packet flow to create the Layer 2 path associated with the packet flow.

24. The computer-readable medium as recited in claim 23, wherein ordering the Layer 2 path segments in an order reflecting an actual Layer 2 path traversal of the packet flow in the network comprises using network topology information to determine a probable order of the path segments.

25. A computer-readable medium as recited in claim 20, wherein the instructions for identifying media termination points associated with the packet flow in each voice over IP segment comprise instructions for carrying out the steps of:

creating and storing at each voice over IP segment a phone call detail record associated with the packet flow; and retrieving at each voice over IP segment the phone call detail record associated with the voice over IP flow.

26. The computer-readable medium as recited in claim 25, wherein retrieving the phone call detail record associated with the packet flow comprises submitting to a call agent at each voice over IP segment a query for the phone call detail record, wherein the query comprises specified query parameters that are associated with the packet flow and that are selected from among a specified called number value, a specified call time value, and a specified delta time period value reflecting an uncertainty period in the call time.

27. The computer-readable medium as recited in claim 25, wherein creating and storing at each voice over IP segment a phone call detail record associated with the packet flow comprises creating and storing a phone call detail record that includes a calling number value, a called number value, a call connection time value, a call termination time value, and one or more values identifying media termination point IP addresses.

28. A computer-readable medium as recited in claim 26, wherein the instructions for retrieving the phone call detail record further comprise instructions for carrying out the steps of:

determining whether the specified called number matches a corresponding called number in the phone call detail record and whether the specified call time matches within the uncertainty period a corresponding call time in the phone call detail record; and selecting the phone call detail record when the specified called number matches the corresponding called number in the phone call detail record and the specified call time matches within the uncertainty period the corresponding call time in the phone call detail record.

29. A computer-readable medium as recited in claim 28, wherein the instructions for determining whether the specified called number matches a corresponding called number comprise instructions for determining that the specified called number matches the corresponding called number in the phone call detail record if N rightmost digits of the corresponding called number in the phone call detail record match the entire specified called number when neither the specified called number nor the corresponding called number is an empty string and when the specified called number has N digits, wherein N is less than or equal to the number of digits in the corresponding called number in the phone call detail record.

30. A computer-readable medium as recited in claim 28, wherein the instructions for determining whether the specified called number matches a corresponding called number in the phone call detail record comprise instructions for determining that the specified called number matches the corresponding called number in the phone call detail record if M right most digits of the specified called number match the entire corresponding called number in the phone call detail record when neither the specified called number nor the corresponding called number is an empty string and when the corresponding called number in the phone call detail record has M digits, wherein M is less than the number of digits in the specified called number.

31. The computer-readable medium as recited in claim 28, wherein determining whether the specified called number matches a corresponding called number in the phone call detail record comprises determining that the specified called number matches the corresponding called number in the phone call detail record when the specified called number is an empty string.

32. The computer-readable medium as recited in claim 28, wherein determining whether the specified called number matches a corresponding called number comprises determining that the specified called number matches the corresponding called number in the phone detail record when the corresponding called number in the phone call detail record is an empty string.

33. An apparatus for creating and storing troubleshooting information for diagnosing one or more problems experienced in one or more completed voice calls that are carried by a packet-switched data network, comprising:
   means for creating and storing first information representing a Layer 3 path of a packet flow of a completed call that has passed through the data network;
   means for creating and storing second information representing a Layer 2 path of a packet flow of the completed call that has passed through the data network;
   means for retrieving one or more selected phone call detail records that are associated with the completed call from a database of phone call detail records for a large plurality of completed calls; and
   means for providing the first information, second information, and selected phone call detail records to a user for use in evaluating one or more problems experienced in the completed call.

34. An apparatus for creating and storing troubleshooting information for diagnosing one or more problems experienced in one or more completed voice calls that are carried by a packet-switched data network, comprising:
   a network interface that is coupled to the data network for receiving one or more packet flows therefrom;
   a processor;
   one or more stored sequences of instructions which, when executed by the processor, cause the processor to carry out the steps of:
      creating and storing first information representing a Layer 3 path of a packet flow of a completed call that has passed through the data network;
      creating and storing second information representing a Layer 2 path of a packet flow of the completed call that has passed through the data network;
      retrieving one or more selected phone call detail records that are associated with the completed call from a database of phone call detail records for a large plurality of completed calls; and
      providing the first information, second information, and selected phone call detail records to a user for use in evaluating one or more problems experienced in the completed call.

35. The apparatus as recited in claim 34, wherein the instructions, when executed, further cause the processor to carry out the steps of:
   identifying one or more voice over Internet Protocol (IP) segments in the data network;
   identifying one or more media termination points that are associated with the packet flow in each voice over IP segment;
   mapping each media termination point to a corresponding media termination point IP address in the network.

36. The apparatus as recited in claim 35, wherein the instructions, when executed, cause the processor to carry out the steps of creating and storing first information by carrying out the steps of:
   performing a Layer 3 path tracing for a pair of media termination point IP addresses in each voice over IP segment to create a Layer 3 path segment associated with the packet flow in each voice over IP segment;
   ordering the Layer 3 path segments in an order that reflects an actual Layer 3 path traversal of the packet flow through the network for the completed call;
   concatenating the Layer 3 path segments in the order reflecting the actual Layer 3 path traversal of the packet flow to create the Layer 3 path associated with the packet flow.

37. The apparatus as recited in claim 35, wherein the instructions, when executed, cause the processor to carry out the steps of creating and storing second information by carrying out the steps of:
   performing a Layer 2 path tracing for the pair of media termination point IP addresses in each voice over IP segment to create a Layer 2 path segment associated with the packet flow in each voice over IP segment;
   ordering the Layer 2 path segments in an order reflecting an actual Layer 2 path traversal of the packet flow in the network; and
   concatenating the Layer 2 path segments in the order reflecting the actual Layer 2 path traversal of the packet flow to create the Layer 2 path associated with the packet flow.

38. The apparatus as recited in claim 35, wherein the instructions, when executed, cause the processor to carry out the step of identifying media termination points associated with the packet flow in each voice over IP segment by carrying out the steps of:
   creating and storing at each voice over IP segment a phone call detail record associated with the packet flow; and
   retrieving at each voice over IP segment the phone call detail record associated with the voice over IP flow.

39. A computer-readable medium carrying one or more sequences of instructions for diagnosing a voice over IP flow in an IP network, which instructions, when executed by one or more processors, cause the one or more processors to carry out the steps of:

identifying voice over IP segments in the IP network;

identifying media termination points associated with the voice over IP flow in each voice over IP segment;

mapping each media termination point to a corresponding media termination point IP address;

performing a Layer 3 path tracing for a pair of media termination point IP addresses in each voice over IP segment to create a Layer 3 path segment associated with the voice over IP flow in each voice over IP segment;

ordering the Layer 3 path segments in a sequential order reflecting an actual Layer 3 path traversal of the voice over IP flow in the network;

concatenating the Layer 3 path segments in the order reflecting the actual Layer 3 path traversal of the voice over IP flow to create the Layer 3 path associated with the voice over IP flow;

performing a Layer 2 path tracing for the pair of media termination point IP addresses in each voice over IP segment to create a Layer 2 path segment associated with the voice over IP flow in each voice over IP segment;

ordering the Layer 2 path segments in the sequential order reflecting an actual Layer 2 path traversal of the voice over IP flow in the network; and concatenating the Layer 2 path segments in the order reflecting the actual Layer 2 path traversal of the voice over IP flow to create the Layer 2 path associated with the voice over IP flow.

40. An apparatus for diagnosing a voice over IP flow in an IP network, comprising:

means for identifying voice over IP segments in the IP network;

identifying media termination points associated with the voice over IP flow in each voice over IP segment;

means for mapping each media termination point to a corresponding media termination point IP address;

means for performing a Layer 3 path tracing for a pair of media termination point IP addresses in each voice over IP segment to create a Layer 3 path segment associated with the voice over IP flow in each voice over IP segment;

means for ordering the Layer 3 path segments in a sequential order reflecting an actual Layer 3 path traversal of the voice over IP flow in the network;

means for concatenating the Layer 3 path segments in the order reflecting the actual Layer 3 path traversal of the voice over IP flow to create the Layer 3 path associated with the voice over IP flow;

means for performing a Layer 2 path tracing for the pair of media termination point IP addresses in each voice over IP segment to create a Layer 2 path segment associated with the voice over IP flow in each voice over IP segment;

means for ordering the Layer 2 path segments in the sequential order reflecting an actual Layer 2 path traversal of the voice over IP flow in the network; and means for concatenating the Layer 2 path segments in the order reflecting the actual Layer 2 path traversal of the voice over IP flow to create the Layer 2 path associated with the voice over IP flow.

41. An apparatus for diagnosing a voice over IP flow in an IP network, comprising:

a network interface that is coupled to the data network for receiving one or more packet flows therefrom;

a processor;

one or more stored sequences of instructions which, when executed by the processor, cause the processor to carry out the steps of:

identifying voice over IP segments in the IP network;

identifying media termination points associated with the voice over IP flow in each voice over IP segment;

mapping each media termination point to a corresponding media termination point IP address;

performing a Layer 3 path tracing for a pair of media termination point IP addresses in each voice over IP segment to create a Layer 3 path segment associated with the voice over IP flow in each voice over IP segment;

ordering the Layer 3 path segments in a sequential order reflecting an actual Layer 3 path traversal of the voice over IP flow in the network;

concatenating the Layer 3 path segments in the order reflecting the actual Layer 3 path traversal of the voice over IP flow to create the Layer 3 path associated with the voice over IP flow;

performing a Layer 2 path tracing for the pair of media termination point IP addresses in each voice over IP segment to create a Layer 2 path segment associated with the voice over IP flow in each voice over IP segment;

ordering the Layer 2 path segments in the sequential order reflecting an actual Layer 2 path traversal of the voice over IP flow in the network; and concatenating the Layer 2 path segments in the order reflecting the actual Layer 2 path traversal of the voice over IP flow to create the Layer 2 path associated with the voice over IP flow.

* * * * *

UNITED STATES PATENT AND TRADEMARK OFFICE
CERTIFICATE OF CORRECTION

PATENT NO. : 6,781,959 B1
DATED : August 24, 2004
INVENTOR(S) : Garakani et al.

It is certified that error appears in the above-identified patent and that said Letters Patent is hereby corrected as shown below:

The title page should be deleted to appear as per attached title page.

The sheets of drawing consisting of figure 1 and 4, should be deleted to appear as per attached figures.

Signed and Sealed this

Eighth Day of February, 2005

JON W. DUDAS
*Director of the United States Patent and Trademark Office*

(12) United States Patent
Garakani et al.

(10) Patent No.: US 6,781,959 B1
(45) Date of Patent: Aug. 24, 2004

(54) METHOD AND APPARATUS FOR DETERMINING TROUBLESHOOTING INFORMATION FOR COMPLETED CALLS IN A TELECOMMUNICATIONS NETWORK

(75) Inventors: Mehryar Garakani, Los Angeles, CA (US); Jochen Weppner, Belmont, CA (US); John Ahlstrom, Cupertino, CA (US); Stephen Schleimer, San Jose, CA (US); Gerard Berthet, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 792 days.

(21) Appl. No.: 09/629,540

(22) Filed: Jul. 31, 2000

(51) Int. Cl.[7] ............... H04L 1/00; H04L 12/26
(52) U.S. Cl. ............ 370/242; 370/217; 370/218; 709/203; 709/224
(58) Field of Search ............... 370/242, 249, 370/243, 244, 252, 260, 261, 257, 352, 353, 401, 402, 442, 458, 466, 490, 217, 218; 455/423, 427, 428; 709/224, 223, 201–220

(56) References Cited

U.S. PATENT DOCUMENTS 6,445,682 B1 * 9/2002 Weitz ............... 370/257
6,466,548 B1 * 10/2002 Fitzgerald ............ 370/249
6,556,659 B1 * 4/2003 Bowman-Amuah ....... 379/9.04
6,560,222 B1 * 5/2003 Pounds et al. ......... 370/353

* cited by examiner

*Primary Examiner*—Kenneth Vanderpuye
*Assistant Examiner*—Anthony Ton
(74) *Attorney, Agent, or Firm*—Hickman Palermo Truong & Becker LLP

(57) ABSTRACT

A method is disclosed for creating and storing troubleshooting information for diagnosing one or more problems experienced in one or more completed voice calls that are carried by a packet-switched data network. After completion of a voice-over IP call, for example, first information representing a Layer 3 path of a packet flow of a completed call that has passed through the data network is created and stored. Second information representing a Layer 2 path of a packet flow of a completed call that has passed through the data network is also created and stored. From a phone call detail record database, one or more selected phone call detail records are retrieved, which are associated with the completed call from a database of phone call detail records for a large plurality of completed calls. Thus, the likely path of a troubled call is determined, and phone call detail records associated with key points in the path are located. The first information, second information, and selected phone call detail records are provided to a user for use in evaluating one or more problems experienced in the completed call. Based on this information, the user can troubleshoot the call and identify responsive action. In one embodiment, IP path segments of the voice over IP flow are identified and media termination points are identified for each path segment. Layer 2 and Layer 3 path tracing is performed for each IP segment of the voice over IP flow.

41 Claims, 5 Drawing Sheets